(12) United States Patent
Tarasov et al.

(10) Patent No.: US 11,543,553 B2
(45) Date of Patent: Jan. 3, 2023

(54) MULTI-SYNTHETIC APERTURE INDUCTIVE COIL TRANSDUCER

(71) Applicants: Alexander Tarasov, Houston, TX (US); Jinsong Zhao, Houston, TX (US)

(72) Inventors: Alexander Tarasov, Houston, TX (US); Jinsong Zhao, Houston, TX (US)

( * ) Notice: Subject to any disclaimer, the term of this patent is extended or adjusted under 35 U.S.C. 154(b) by 0 days.

(21) Appl. No.: 17/516,060

(22) Filed: Nov. 1, 2021

(65) Prior Publication Data
US 2022/0252751 A1 Aug. 11, 2022

Related U.S. Application Data

(60) Provisional application No. 63/146,820, filed on Feb. 8, 2021.

(51) Int. Cl.
| | | |
|---|---|---|
| *G01N 27/72* | (2006.01) | |
| *G01V 3/10* | (2006.01) | |
| *G01N 27/04* | (2006.01) | |
| *G01B 7/06* | (2006.01) | |

(52) U.S. Cl.
CPC .............. *G01V 3/10* (2013.01); *G01B 7/10* (2013.01); *G01N 27/041* (2013.01); *G01N 27/72* (2013.01)

(58) Field of Classification Search
CPC .............. G01R 33/543; G01R 33/5608; G01R 33/4828; G01R 33/3415; G01R 33/283; G01R 33/307; G01R 33/60; G01V 3/32; G01V 3/10; E21B 49/08; E21B 2049/085; G01N 24/10; G01N 27/041; G01N 27/72; G01B 7/10
See application file for complete search history.

(56) References Cited

U.S. PATENT DOCUMENTS

| | | | |
|---|---|---|---|
| 2013/0083703 A1* | 4/2013 | Granger-Jones | H03H 7/463 370/277 |
| 2016/0003753 A1* | 1/2016 | Augustine | G01R 33/30 324/309 |
| 2017/0070250 A1* | 3/2017 | Kundmann | H04B 7/08 |
| 2018/0331671 A1* | 11/2018 | Jian | H03H 7/463 |

* cited by examiner

*Primary Examiner* — Jermele M Hollington
*Assistant Examiner* — Taqi R Nasir
(74) *Attorney, Agent, or Firm* — Barry Choobin; Patent 360

(57) ABSTRACT

A device and method for nondestructively inspecting, measuring, and/or detecting metallic. The device may enable multiple synthetic apertures for measurements simultaneously. The device includes a transmitter coil array and a receiver coil array wound around a core. The receiver coil array includes multiple receiver coil sections built with gaps in between adjacent sections to form multiple associated apertures. An analog electrical network is coupled to the multiple receiver coil sections to enable multiple combined synthetic apertures to be operated together for the transducer to conduct measurements simultaneously to provide multiple outputs associated to the multiple synthetic apertures. Measurement signals can be combined to build a processed signal that can represent more accurate information from the target.

7 Claims, 10 Drawing Sheets

MULTI-SYNTHETIC APERTURE INDUCTIVE COIL TRANSDUCER

CROSS-REFERENCE TO RELATED APPLICATIONS

This application claims priority from the U.S. provisional patent application Ser. No. 63/146,820, filed on Feb. 8, 2021, which is incorporated herein by reference in its entirety.

FIELD OF INVENTION

The present invention relates to an inductive coil transducer, and more particularly, the present invention relates to a multi-synthetic aperture inductive coil transducer in which multiple synthetic apertures can be operated to generate measurement signals simultaneously.

BACKGROUND OF THE INVENTION

For a transducer, the aperture is defined as the spatial sensitivity function. It indicates the sensor signal measurable level corresponding to the detectible zone targeted by a transducer. Each transmitter coil or receiver coil of the inductive transducer has its own aperture characterized by engineering designs. The individual apertures in the inductive transducer can be combined to form a synthetic aperture. The desired synthetic aperture is determined by the application of the transducer for various measurement goals of remote target investigation such as distances, directions, depths, and spatial resolutions of the target features. As a result, each aperture can capture the information from the measurement target in different combinations of distances, directions, depths, and spatial resolutions.

Currently, an inductive coil transducer can only enable a single synthetic aperture at any one time. To get different apertures, the network connecting the sensor coils must be rearranged. Due to the requirement, the measurements from reconfigurable apertures must be operated sequentially rather than simultaneously, which requires multiple acquisitions following each reconfiguration. Or, to conduct the multi-aperture measurements simultaneously with a single-aperture transducer, one shall use a system and operate together with multiple single-aperture transducers where each transducer is configured with its own unique aperture.

Consequently, there is a need for an improved inductive coil transducer design that may be capable of enabling multiple synthetic apertures simultaneously.

Hereinafter, the terms "inductive transducer" and "inductive sensor" are interchangeably used.

SUMMARY OF THE INVENTION

The following presents a simplified summary of one or more embodiments of the present invention to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a multiple synthetic aperture inductive coil transducer that permits operating multiple synthetic apertures simultaneously.

It is another object of the present invention that the inductive coil transducer more accurately detects and records multiple types of information.

It is still another object of the present invention that the inductive coil transducer achieves a better representation of the target (signal texture and investigation depth) by enhancing the sensor's spatial resolution via the use of multiple synthetic apertures.

It is yet another object of the present invention that the inductive coil transducer nondestructively evaluates the material properties, searches metallic objects, and/or locates metal proximity.

These and other needs in the art are addressed in one embodiment by a device including an inductive coil transducer for nondestructively inspecting, measuring, and/or detecting metallic objects. The inductive coil transducer includes a transmitter coil array, a receiver coil array, a core, and an analog electrical network. The analog electrical network includes either active circuits or passive circuits, which enables multiple synthetic apertures simultaneously.

These and other needs in the art are addressed in one embodiment by a method for nondestructively inspecting metallic objects, including using an inductive coil transducer, measuring the signals from all enabled synthetic apertures simultaneously, and combining the signals from all synthetic apertures. The signals can be further processed and enhanced either in analog domain or in digital domain to recreate the original target's features that are sensed by the multiple-aperture inductive transducer.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprise", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention, since the scope of the invention will be best defined by the allowed claims of any resulting patent.

Disclosed is an inductive coil transducer and a method for nondestructively inspecting, measuring, and/or detecting metallic objects. In embodiments, an inspection device can develop a magnetic field upon exciting the transmitter coil with a current. Alternatively, an induced voltage signal can be developed across the receiver coil when the magnetic field changes corresponding to the features of the target. By measuring the voltage signal on the receiver coil, the properties or proximities of metallic objects that interact with the magnetic field can be determined.

Figure 1:
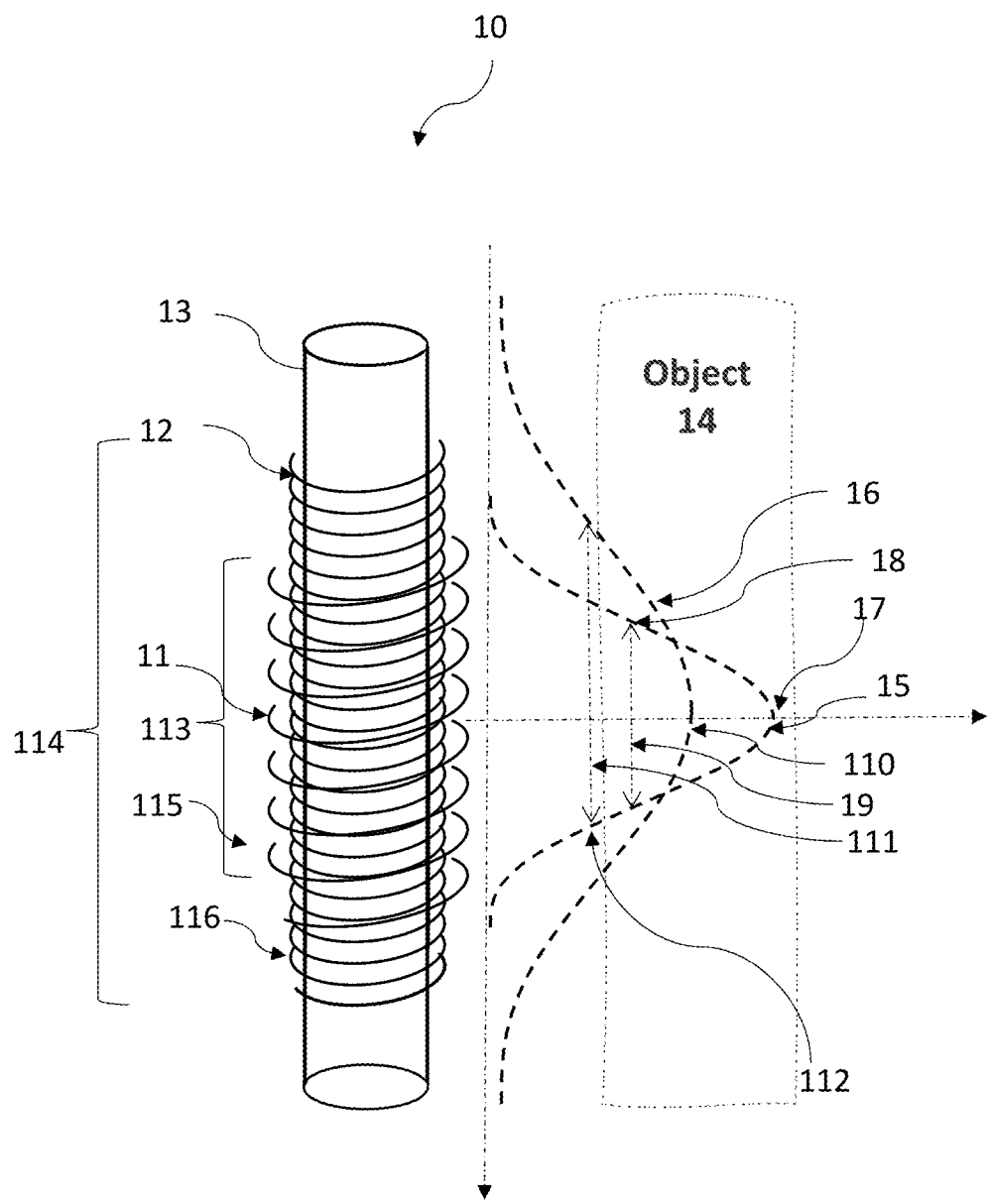
FIG. 1 illustrates the disclosed inductive coil transducer, according to an exemplary embodiment of the present invention.

FIG. 1 illustrates an inspection device comprising an inductive coil transducer 10. In embodiments, the inductive coil transducer 10 can include a transmitter coil array 11, a receiver coil array 12, and a core 13. The transmitter coil array 11 and the receiver coil array 12 are wound on the core 13. The material of core 13 can be either a ferromagnetic material or non-ferromagnetic material. An object 14 is the target the transducer tends to measure or detect. Aperture 15 can be an aperture of the transmitter coil array 11 and aperture 16 can be an aperture of the receiver coil array 12, respectively. The aperture 15 has its peak point 17 and the half peak (−3 dB) point 18. The distance in between the two half peak points on aperture 15 is the aperture width 19. The aperture peak 17 position is normally aligned to the center of the transmitter coil array 11 when the arrangement of coil winding is symmetrical. However, coil arrangement can be unsymmetrical for design reasons. The transmitter coil 11 has its space location on the core 13 with coil placement section length 113. The total number of the coil turns 115 of the transmitter coil array 11 must be placed within the section for given section length 113 by design. Multiple layer placement of coils is normal when required. The aperture peak 17 and aperture width 19 of the aperture 15, generated by the transmitter coil array 11, are determined mathematically by the coil section length 113 and the total turns 115. Similarly, the aperture 16 has its peak point 110 and the half peak (−3 dB) point 112. The distance in between the two half peak points on aperture 16 is the aperture width 111. The aperture peak 110 position is normally aligned to the center of the receiver coil array 12 when the arrangement of coil winding is symmetrical. However, coil arrangement can be unsymmetrical for design reasons. The receiver coil array 12 has its space location on the core 13 with coil placement section length 114. The total number of the coil turns 116 of the receiver coil array 12 must be placed within the section for given section length 114 by design. Multiple layer placement of coils is normal when needed. The aperture peak 110 and width 111 of the aperture 16, generated by the receiver coil array 12, are determined mathematically by the coil section length 114 and the total turns 116.

As illustrated in FIG. 1, the inductive coil transducer 10 may be used to determine the various properties or proximities of object 14. The object 14 may be an object containing metallic components, which can interact with the magnetic field such as, without limitation, iron plates, orthopedic implants, and even vehicles. The object 14 may be stationary or moving with respect to inductive coil transducer 10. The properties of object 14 may be, but are not limited to, permittivity, permeability, conductivity, and/or dimensions such as, without limitation, length, width, and/or thickness. The proximities of object 14 may be, but are not limited to, distance, location, or existence.

In embodiments, the transmitter coil array 11 may include one or more transmitter coils. The transmitter coil array 11 may be a wire wrapped around the core 13 and the receiver coil array 12. The transmitter coil array 11 may be made from any suitable material. Suitable materials may be, but are not limited to, copper, silver, gold, and/or any combination thereof. Further, transmitter coil array 11 may have the property of transmitter aperture 15, which is defined as the sensitivity over space and can be designed in engineering. The shapes of transmitter aperture 15 may be, but are not limited to, Gaussian-like shape or Laplacian of Gaussian (LoG)-like shape.

In embodiments, receiver coil array 12 may include multiple receiver coil sections that are constructed into multiple coil sections. For a transducer, the lengths of the coil sections of the coil array, the numbers of layers and coil turns for each section, and total number of coil sections may be altered based on the application and other engineering designs and parameters, while still utilizing the same principle of operation. The receiver coil array 12 may be a wire wrapped around core 13. Receiver coil array 12 may be made from any suitable material. Suitable materials may be, but are not limited to, copper, silver, gold, and/or any combination thereof. Furthermore, the receiver coil array 12 may have the property of the receiver aperture 16, which is defined as the sensitivity over space and can be designed in engineering. The shapes of receiver aperture 16 may be, but are not limited to, Gaussian-like shape or Laplacian of Gaussian (LoG)-like shape.

Figure 2:
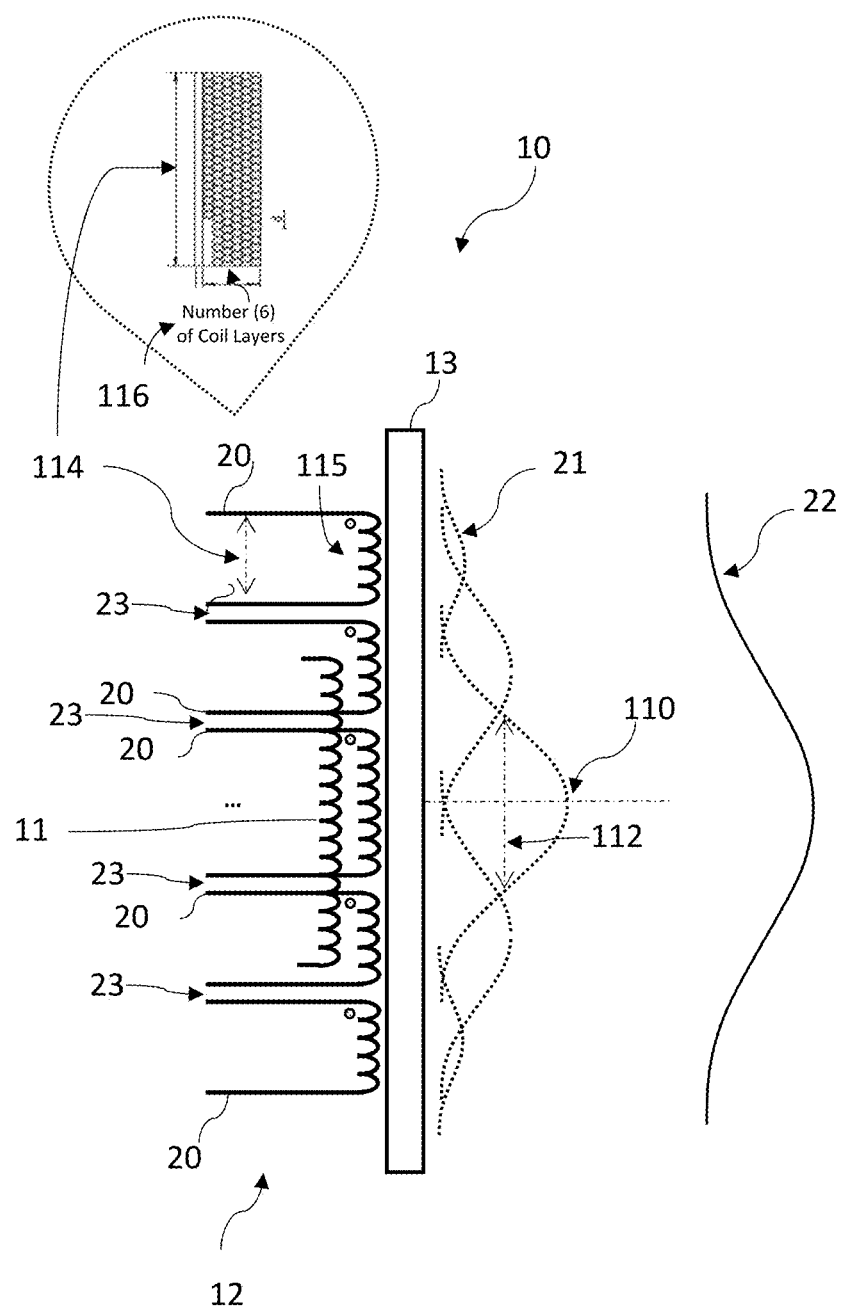
FIG. 2 illustrates the inductive coil transducer with multiple receiver apertures from individual coils in the receiver coil array, according to an exemplary embodiment of the present invention.
Figure 3A:
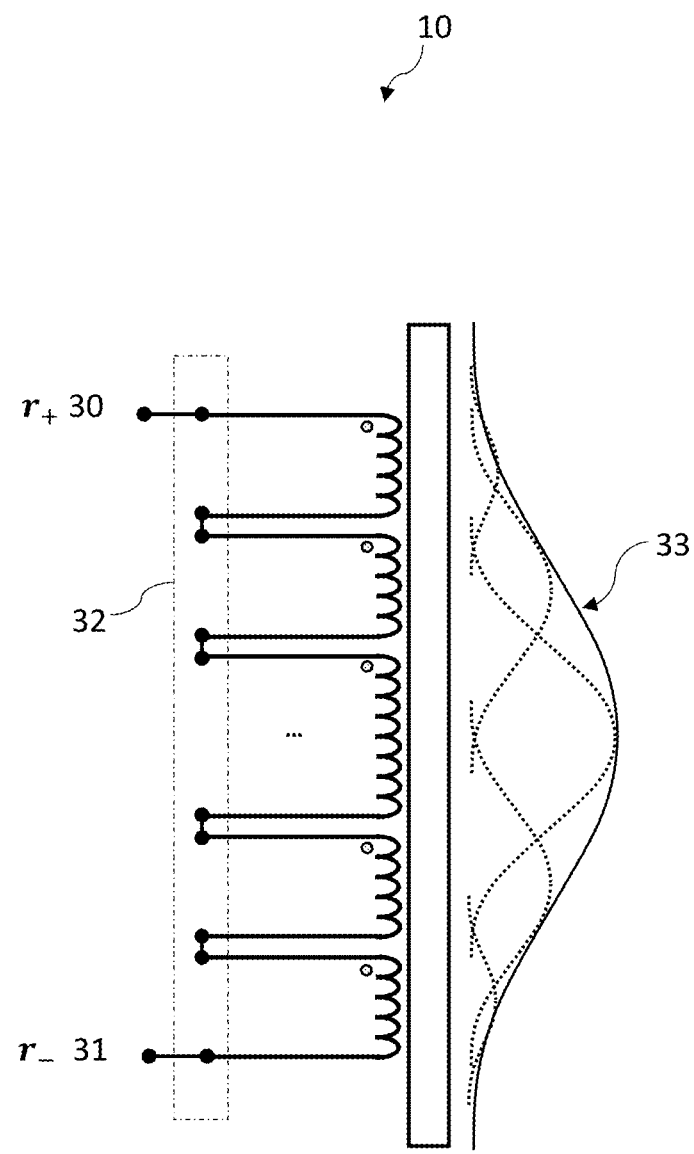
FIG. 3A illustrates an inductive coil transducer with a synthetic Gaussian-like receiver aperture constructed by combining all the individual apertures together electrically with connecting all the receiver coil sections in series through a network, according to an exemplary embodiment of the present invention.
Figure 3B:
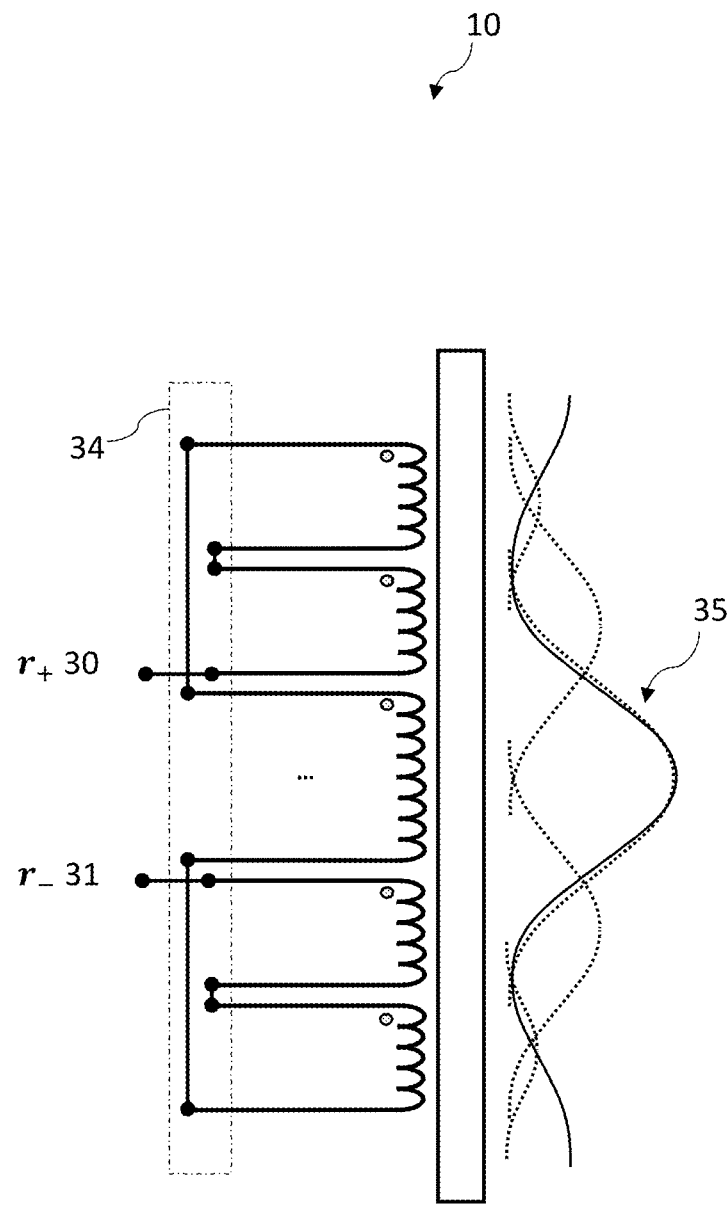
FIG. 3B illustrates an embodiment of an inductive coil transducer with a synthetic Laplacian of Gaussian-like receiver aperture by configuring multiple receiver coil sections in a specific way, which is different from FIG. 3A, to provide another desired aperture mode.
Figure 3C:
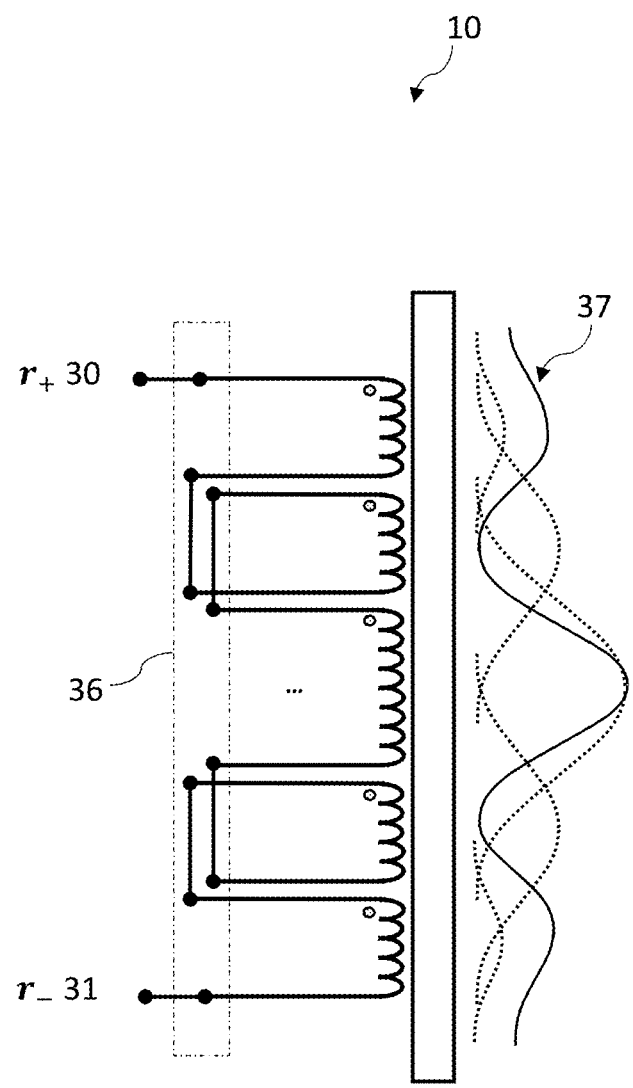
FIG. 3C illustrates an inductive coil transducer with a synthetic 2nd order Laplacian of Gaussian-like receiver aperture by rearranging the coil sensor connection network in another specific way, according to an exemplary embodiment of the present invention.

FIG. 2 illustrates five receiver coil sections 20 in the receiver coil array 12, where each of the coils has its own inherent unique aperture 21 in terms of the peak value 110 at the center location and the aperture width 112. The aperture 21 is determined by its associated coil section length 114 and total number of turns 115 within the receiver coil section 20. The spacing gap width 23 in between two adjacent coil sections 20 also set up the spatial relationship in between two adjacent apertures 21. As a result, a unique sequence of the aperture 21, as in a designed order of the receiver coil sections 20, is composed by choosing and placing the multiple receiver coil sections 20 in various lengths 114, total number of coil turns 115 for each coil section, number of coil layers 116 within the coil section, and the spacing gaps 23 along the core 13 in an order to form the receiver coil array 12. The aperture sequence 21 is normally symmetrical for the purpose of easily analyzing measured data after the measurements. But the aperture sequence can be designed as an unsymmetrical format for the various purposes of engineering and applications. Synthetic receiver aperture 22 of receiver coil array 12 can be a combination of all individual receiver apertures 21 by applying a simple network connection. It is to be understood that while five receiver coil sections are shown in the drawings, the number of receiver coil sections can be varied without departing from the scope of the present invention. In one implementation, different configurations of the network connections can be made to create different synthetic apertures. Suitable adjustments that can be applied on, but are not limited to, include connection point, coil length, and polarity. One exemplary embodiment of the modifications in the network connection is illustrated in FIGS. 3A-3C. The transmitter coil array can also have similar construction and functionality as described for the receiver coil array.

FIG. 3A-3C illustrates examples of enabling various synthetic receiver apertures by applying different simple network connections among the receiver coil sections within the inductive coil transducer 10. FIG. 3A shows Gaussian-like shape synthetic receiver aperture 33, FIG. 3B shows LoG-like shape synthetic receiver aperture 35, and FIG. 3C shows a $2^{nd}$ order LoG-like shape synthetic receiver aperture 37. The three synthetic apertures can be achieved when measuring between points 30 and 31 after simple network connections 32, 34, and 36 are applied inside inductive coil transducer 10 respectively.

As illustrated in FIG. 3A-3C, a simple network connection such as 32, 34, or 36 can be used to achieve different synthetic apertures for one transducer with designed receiver coil array built in. Each of the apertures uses a different network connection and as the result, all the apertures cannot be operated simultaneously. In order to reconfigure the coil arrangement to achieve different desired aperture, the connection network must be changed. This would require either physically changing or switching the network connections to operate sequentially or using multiple transducers, where each of them can have its own different network connection for its aperture characteristics to operate together simultaneously. To achieve multiple different synthetic apertures simultaneously while using only one transducer array may require developing a unique analog electronic circuit that could combine coil sections together to operate multiple apertures simultaneously without physically or dynamically changing or switching the network connections.

Figure 4:
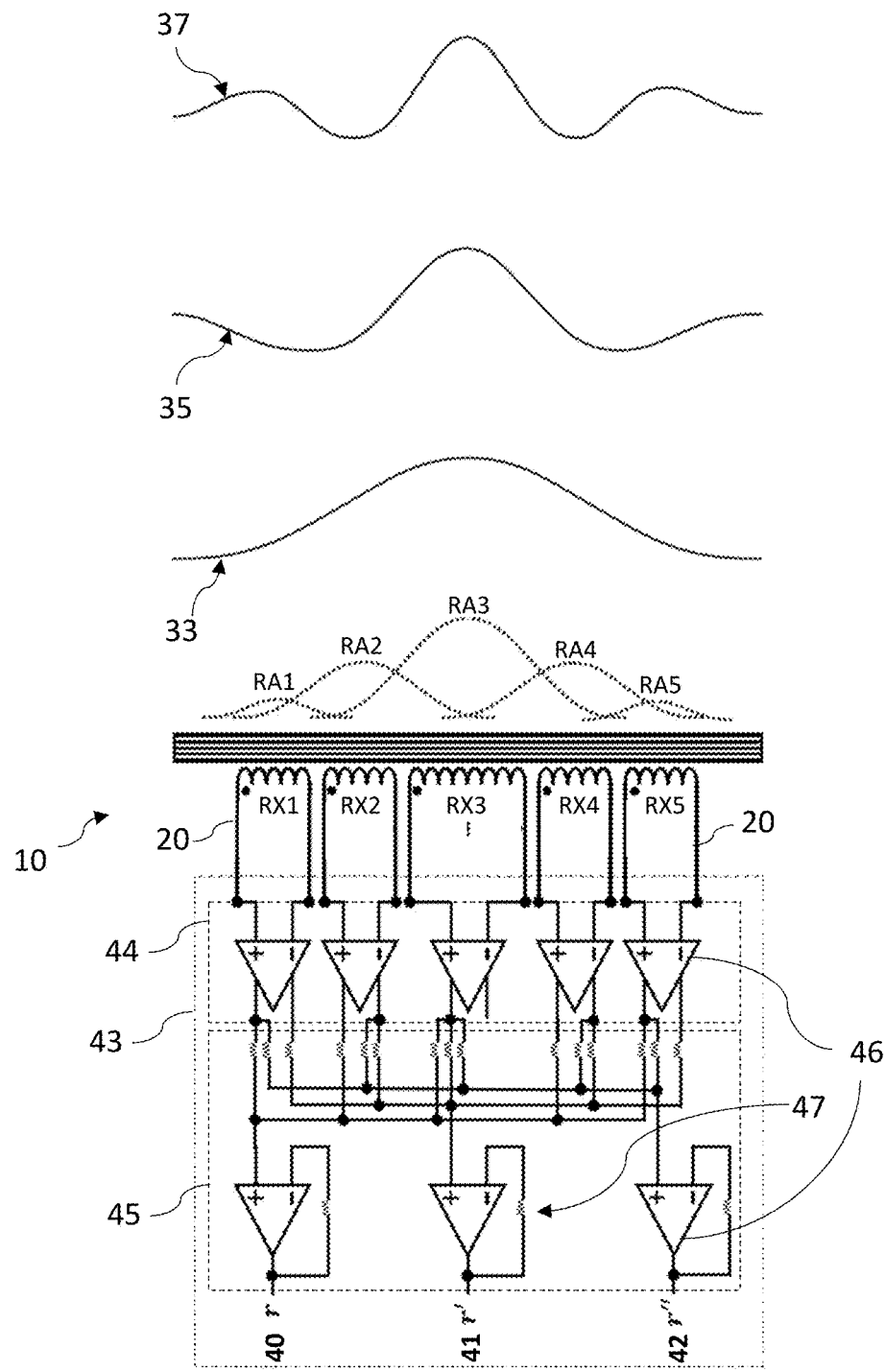
FIG. 4 illustrates an inductive coil transducer with an active analog electrical network to enable multiple synthetic receiver apertures simultaneously, according to an exemplary embodiment of the present invention.

FIG. 4 illustrates an exemplary embodiment of enabling multiple synthetic receiver apertures simultaneously by connecting an active analog electrical network 43 to an inductive coil transducer 10. Shown in FIG. 4, five receiver coil sections 20, in various coil section widths 114 with total number of coil turns 115 for each of the receiver coil sections 20 and the section gap 23 in between the two adjacent coil sections 20, yield the individual inherent apertures 21 labeled in from RA1 to RA5 for each of the receiver coil sections 20 from RX1 to RX5, respectively. Active analog electrical network 43 can include both active electronic components and passive electronic components. Active electronic components may be, but are not limited to, diodes, transistors, MOSFETS, and op-amps. Passive electronic components may be, but are not limited to, resistors, capacitors, inductors, and transformers. In the example shown in FIG. 4, an active analog electrical network 43 has two stages of network circuits: the impedance isolation stage 44 and the analog calculation stage 45. The circuit topology connections are shown in the box 44 by design. The impedance isolation stage 44 has the same number of the operational amplifier (Op-amp) 46 as the number of the receiver coil sections 20. The Op-amp 46 has a differential input pair with very high input impedance that shall not impact the signal characteristics from receiver coil sections 20 with considerably low output impedances. In addition, the isolation stage 44 isolates the impacts from the input impedances of analog calculations stage 45 directly connected to the measurement signals from receiver coil sections 20. Furthermore, the positive input node of Op-amp 46, labeled in "+" sign, is connected to the positive polarity node, labeled in a large dot sign, of the output pair of a receiver coil section 20. The negative input node of Op-amp 46, labeled in "−" sign, is connected to the opposite node, without the sign label, of the output pair of a receiver coil section 20. Similarly, the positive output node and negative output node of Op-amp 46 in the isolation stage 44 output the signals in positive polarity and the negative polarity, respectively. The analog calculation stage 45 uses the resistor network with the op-amp 46 with the negative feedback loop to select the arithmetic "Plus" and "Minus" by the connections to output nodes, in positive polarity or in negative polarity, of the Op-Amp from the isolation stage 44, respectively. The signal amplifying gain of the stage 45 can be achieved by choosing the feedback resistors 47 linked within the Op-amp 46 in the analog calculation stage 45. Therefore, the signal outputs of active analog network 43 will be the following:

a. The signal from output 40 is corresponding to the synthetic aperture 33 of the spatial sensitivity by combining all individual apertures in RA3+RA1+RA5+RA2+RA4;

b. The signal from output 41 is corresponding to the synthetic aperture 35 of the spatial sensitivity by combining all individual apertures in RA3−RA1−RA5−RA2−RA4;

c. The signal from output 42 is corresponding to the synthetic aperture 37 of the spatial sensitivity by combining all individual apertures in RA3+RA1+RA5−RA2−RA4.

Gaussian-like shape synthetic receiver aperture 33, LoG-like shape synthetic receiver aperture 35, and $2^{nd}$ order LoG-like shape synthetic receiver aperture 37 can be enabled and operated simultaneously when measuring at points 40, 41, and 42, respectively after an active analog electrical network 43 is connected to the inductive coil transducer 10. The measurement signals can be single-ended or differential depending upon the configuration of the active analog electrical network 43.

Figure 5:
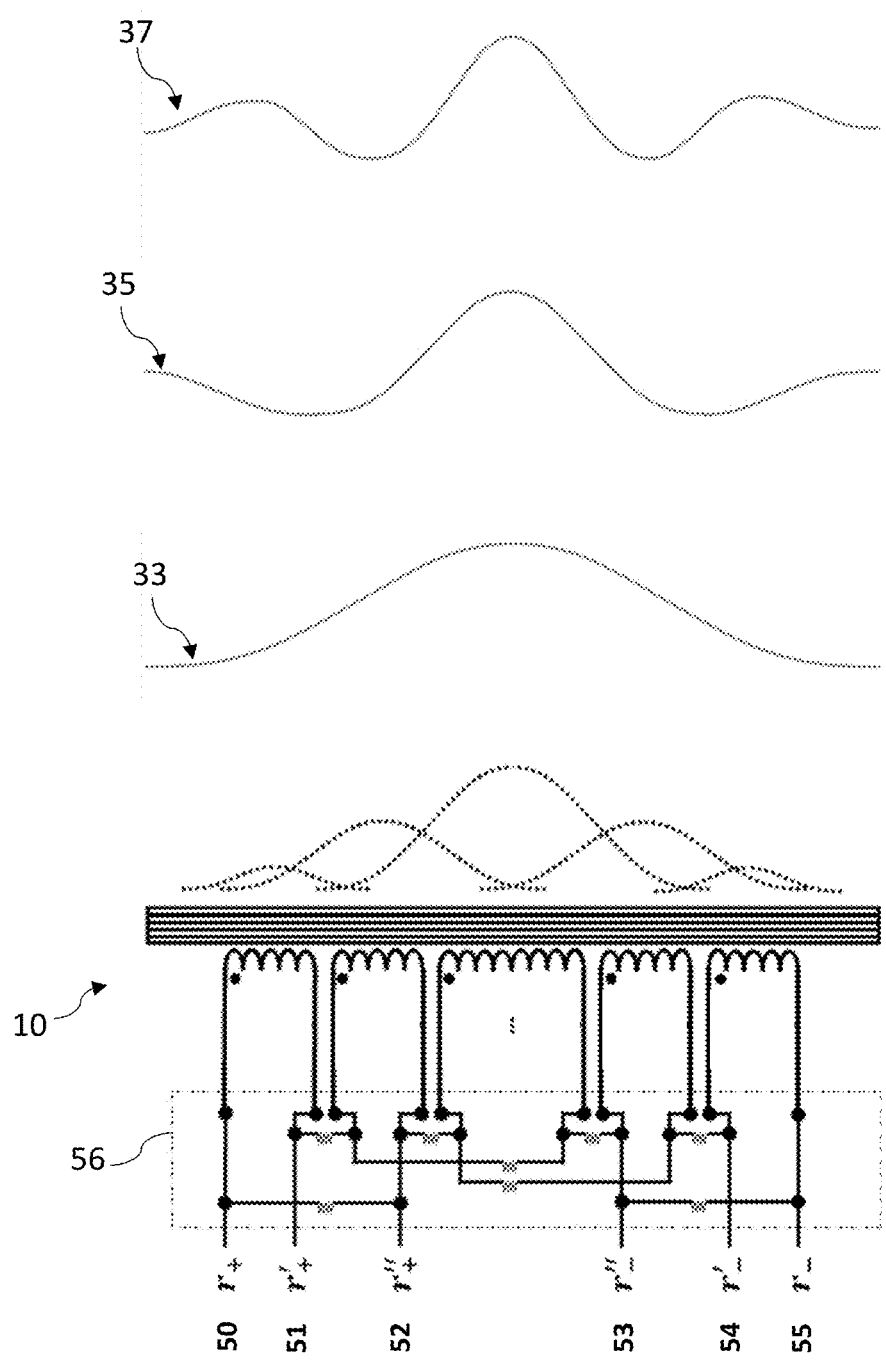
FIG. 5 illustrates an inductive coil transducer with a passive analog electrical network to enable multiple synthetic receiver apertures simultaneously, according to an exemplary embodiment of the present invention.

FIG. 5 illustrates another exemplary embodiment for enabling multiple synthetic receiver apertures simultaneously by connecting a passive analog electrical network 56 to the inductive coil transducer 10. Passive analog electrical network 56 includes only passive electronic components. Passive electronic components may be, but are not limited to, resistors, capacitors, inductors, and transformers. Gaussian-like shape synthetic receiver aperture 33, LoG-like shape synthetic receiver aperture 35, and $2^{nd}$ order LoG-like shape synthetic receiver aperture 37 can be enabled and operated simultaneously when measuring between points 50 & 55, 51 & 54, and 52 & 53 respectively after passive analog electrical network 56 is connected to an inductive coil transducer 10. The measurement signals are differential.

FIGS. 4 and 5 illustrate that by adding an analog electrical network, either active or passive, multiple synthetic apertures can be enabled and operated simultaneously on a single inductive coil transducer 10. It is not necessary to excite the transducer multiple times as the connection inside the network remains unchanged.

Figure 6:
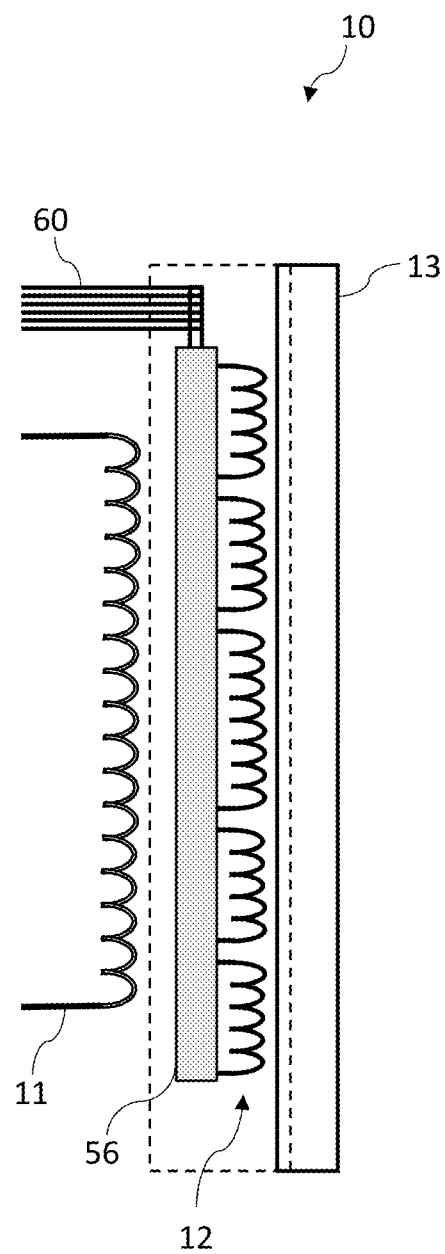
FIG. 6 illustrates an inductive coil transducer with a passive analog electrical network that can be built in or embedded in inside layers of one coil section or inside the gaps among the sections of coils as one component, according to an exemplary embodiment of the present invention.

As illustrated in FIG. 6, passive analog electrical network 56 may be built in a distributed way (hidden) inside the layers of coils or inside the gaps of coil sections in either transmitter coil array 11 or receiver coil array 12 via any suitable mechanism. Suitable mechanisms may be, but are not limited to, PCB, conduit, and/or container. Wire Leads 60 may be outside the bundle for aperture selection. With bundling, inductive coil transducer 10 includes transmitter coil array 11, receiver coil array 12, core 13, and the hidden network 56. Transmitter coil array 11 and receiver coil array 12 are built around core 13. Transmitter coil array 11 may include one or more transmitter coils. The receiver coil array 12 may include one or more receiver coil sections, zero or more bundled passive analog electrical networks.

Figure 7:
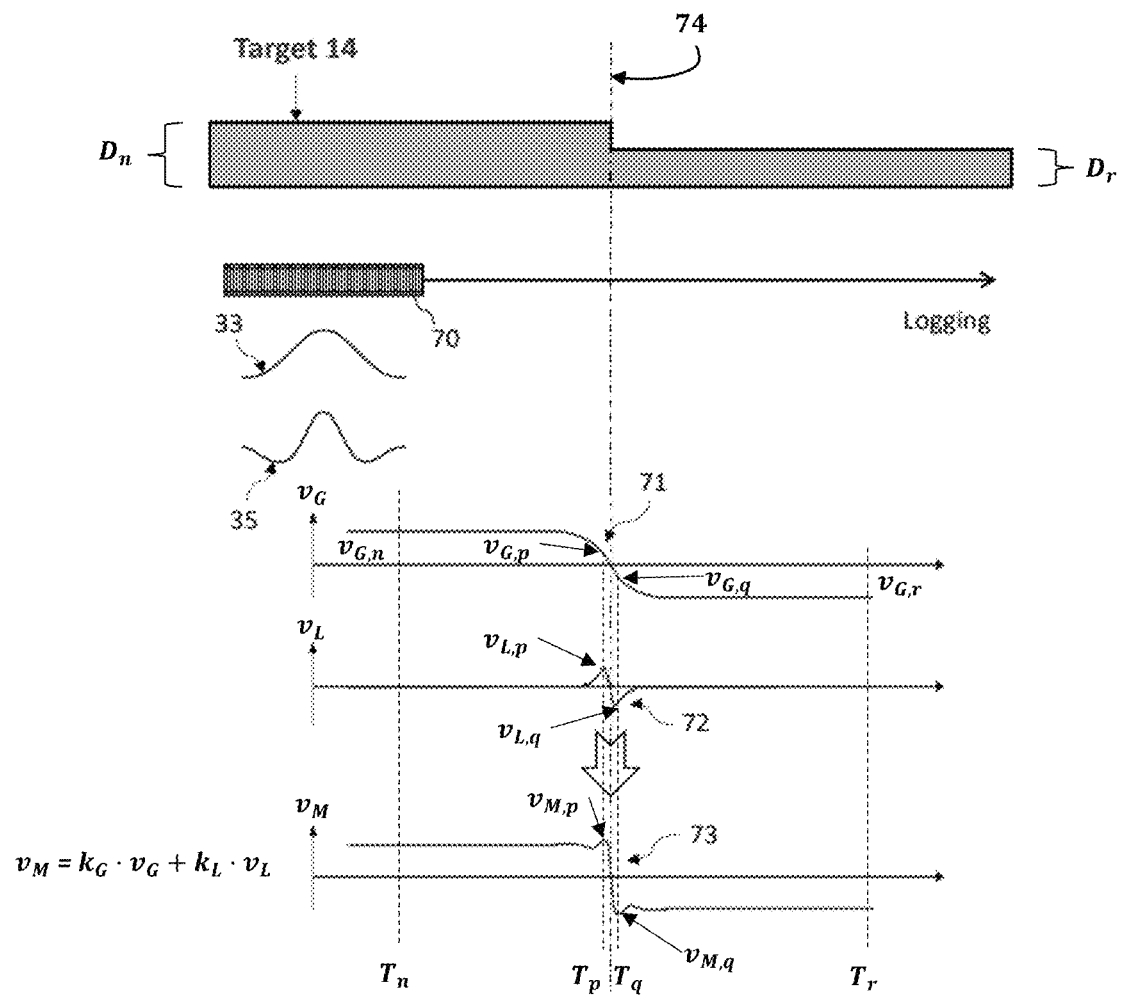
FIG. 7 illustrates combining two simultaneous synthetic receiver apertures to rebuild results, according to an exemplary embodiment of the present invention.

FIG. 7 illustrates an example of the effect of using multi-aperture inductive coil transducer 70 over single-aperture inductive coil transducers. The graph simulates a metal property detection of object 14 in a motion logging process. Multi-aperture inductive coil transducer 70 is aimed to detect the thickness changes on object 14. Multi-aperture inductive coil transducer 70 has two simultaneous receiver apertures: Gaussian-like shape synthetic receiver aperture 33 and LoG-like shape synthetic receiver aperture 35, and logs in the direction as illustrated in FIG. 7. An inductive coil transducer with Gaussian-like shape synthetic receiver aperture 33 enabled may be able to detect changes as an average (spatial low-pass filter—LPF), resulting in measurement signal 71. However, it may not be able to detect small and abrupt spatial changes. Conversely, an inductive coil transducer with LoG-like shape synthetic receiver aperture 35 enabled may acquire measurement signal 72. It comprises the ability to detect small and abrupt changes but does not comprise the ability of detection of large and gradual spatial changes (spatial band-pass filter—BPF). Using multi-aperture inductive coil transducer 70, which has both Gaussian-like shape synthetic receiver aperture 33 and LoG-like shape synthetic receiver aperture 35 enabled simultaneously, both measurement signals 71 and 72 may be acquired within one single excitation. It may achieve the detection of not only large and gradual, but also small and abrupt features, simultaneously. Measurement signals 71 from the outputs 50 to 55 and 72 from the outputs 51 to 54 may be combined mathematically into measurement signal 73 to extract target features with post-processing algorithm, such as linearly weighted sum in $$v_M = k_G \cdot v_G + k_L \cdot v_L \quad (1)$$

Measurement signal 73, shows a shape that is closer to real object 14 than any of the measurement signals obtained from an individual aperture sensor.

Figure 8:
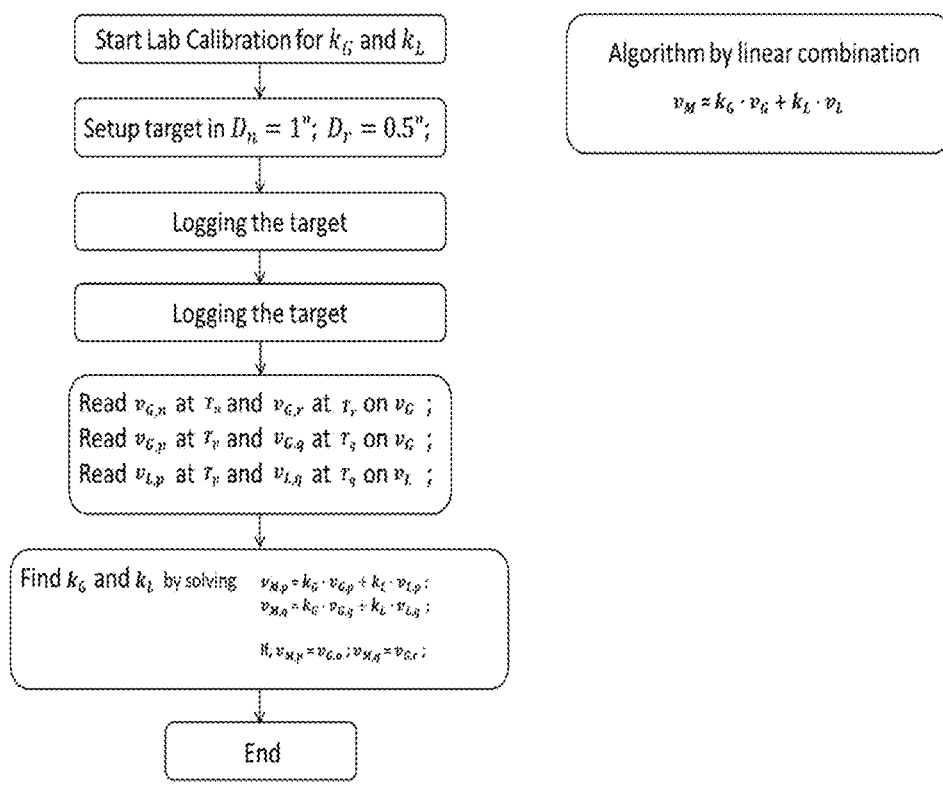
FIG. 8 illustrates the processes for lab test and calibration as well as the combination algorithm method, according to an exemplary embodiment of the present invention.

FIG. 8 illustrate the processes for lab test and calibration as well as the combination algorithm method for signal measurement data sets from the multiple apertures. In order to combine the signal 71 and 72 in a linearly weighted format shown in Equation (1) above, a lab calibration process is needed to determine the weight coefficients $k_G$ and $k_L$. In the lab condition, setup calibration target metal plate, Target 14 with the thickness $D_n$ and thickness $D_r = 0.5 \cdot D_n$, respectively, based on the normal operational metal plate thickness measurement range. For instance, the normal operational metal plate thickness measurement range is around 1″ or less. The calibration may be setup for the thickness $D_n = 1''$ and thickness $D_r = 0.5''$. By following the steps of the lab calibration in FIG. 8 the weighted coefficients $k_G$ and $k_L$, can be determined. The calibration can also be setup in a pipe when the regular operation is to measure the pipe thickness changes. The transducer and the pipe are concentric.

The linearly weighted combination algorithm is also shown in FIG. 8 and in Equation (1). The combined signal 73 shown in FIG. 7, represents better spatial responses to the metal thickness change in transition, one of the measurement characteristics or properties for the inspection target, from $D_n$ to $D_r$ at the location 74 than the individual signal 71 measured from the Gaussian-like shape synthetic aperture 33 or signal 72 measured from the LoG-like shape synthetic aperture 35. Similarly, when the multiple-synthetic aperture transducer is used for detecting the locations of defects embedded in the metal object 14 body under the surface, the "sharp edge" signal, such as processed signal 73, can be achieved by combining the measurement signals from the multiple synthetic apertures to provide high contrast and texture for detecting the defect locations, edges, and boundaries.

As the general concept of the present invention has been defined, it is important to note that the current invention presents clear advantages in the real-world environment conditions. Besides technological advantages of the present invention as described above, such as better measurement target representation, there are other benefits associated with the present invention. As an example, when compared to the single aperture measurement transducers, multi-aperture inductive inductive transducer can perform measurements of large-scale objects such as long pipes faster as there is no need to scan a target area several times using different configurations of single apertures. Some industries such as a downhole well integrity logging industry may need to perform measurement on pipes that can sometimes exceed 10000 ft in length. Such measurements often take hours and even days to complete using conventional single-aperture technology. Using multiple aperture inductive coil transducer can therefore greatly reduce time and cost associated with performing the measurements as well having to suspend well operation/production in order to complete the measurement.

Although the present invention and its advantages have been described in detail, it should be understood that various changes, substitutions, and alterations may be made herein without departing from the spirit and scope of the invention as defined by the appended claims.

This disclosure relates to an inductive coil transducer that is capable of nondestructively evaluating the material properties, searching metallic objects, and/or locating metal proximity. It has been widely used in industrial applications, such as search coils, metal detectors, traffic sensors, etc.

What is claimed is:

1. A device for nondestructively inspecting, measuring, and/or detecting metallic objects comprising:
    an inductive coil transducer, wherein the inductive coil transducer comprises:
        a core;
        a transmitter coil array coupled to the core;
        a receiver coil array coupled to the core, the receiver coil array comprises a plurality of receiver coil sections in a predetermined order;
        each receiver coil section of the plurality of receiver coil sections has a predetermined section width, a predetermined number of coil turns, and a predetermined number of coil layers, wherein a spacing between adjacent receiver coil sections of the plurality of receiver coil sections is proportional to a spatial distance between two respective apertures; and
        an analog electrical network electrically coupled to the plurality of receiver coil sections in a predetermined topology and configured to enable and operate a plurality of synthetic apertures simultaneously, wherein the analog electrical network comprises a plurality of output nodes configured to output a plurality of signals simultaneously, wherein each signal of the plurality of signals corresponds to a measurement signal derived from a synthetic aperture of the plurality of synthetic apertures.

2. The device of claim 1, wherein the transmitter coil array and the receiver coil array are wound around the core, the core is made of ferromagnetic material or non-ferromagnetic material.

3. The device of claim 1, wherein the analog electrical network is an active analog electrical network.

4. The device of claim 1, wherein the analog electrical network is a passive analog electrical network.

5. The device of claim 1, wherein the analog electrical network is embedded in spacings between the plurality of receiver coil sections to permit the inductive coil transducer to simultaneously output the plurality of signals corresponding to the plurality of synthetic apertures.

6. A method for nondestructively inspecting, measuring, and/or detecting metallic object comprising:
    implementing an inductive coil transducer, wherein the inductive coil transducer comprises:
        a core,
        a transmitter coil array coupled to the core,
        a receiver coil array coupled to the core, the receiver coil array comprises a plurality of receiver coil sections in a predetermined order;
        each receiver coil section of the plurality of receiver coil sections has a predetermined section width, a predetermined number of coil turns, and a predetermined number of coil layers, wherein a spacing between adjacent receiver coil sections of the plurality of receiver coil sections is proportional to a spatial distance between two respective apertures, and
        an analog electrical network electrically coupled to the plurality of receiver coil sections in a predetermined topology and configured to enable and operate a plurality of synthetic apertures simultaneously, wherein the analog electrical network comprises a plurality of output nodes configured to output a plurality of signals simultaneously, wherein each signal of the plurality of signals corresponds to a measurement signal derived from a synthetic aperture of the plurality of synthetic apertures;
    generating, by the analog electrical network, based on the predetermined topology, the plurality of signal simultaneously;
    measuring a plurality of measurement signals from the plurality of synthetic apertures simultaneously; and
    processing the plurality of measured signals altogether using a predetermined combination algorithm to output a processed signal representative of a characteristics of the metallic object.

7. The method of claim 6, wherein the plurality of measurement signals are combined in an analog domain or in a digital domain to extract a plurality of features of the metallic object corresponding to a high bandwidth of spatial frequency spectrum in the processed signal, wherein the plurality of features are selected from a group consisting of metal thickness changes, flows inside a metal body, changes of electrical conductivity, and magnetic permeability.

* * * * *